Jan. 7, 1936.  P. F. ZERKLE  2,027,217
INDICATOR
Filed Jan. 28, 1932  2 Sheets-Sheet 1
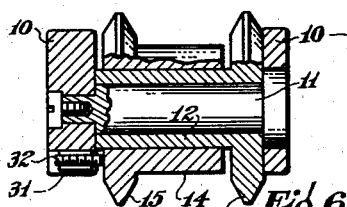
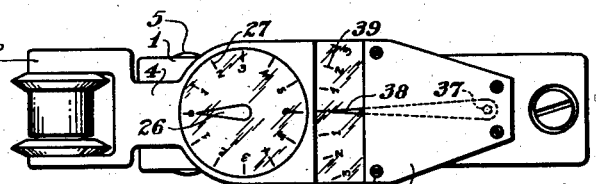
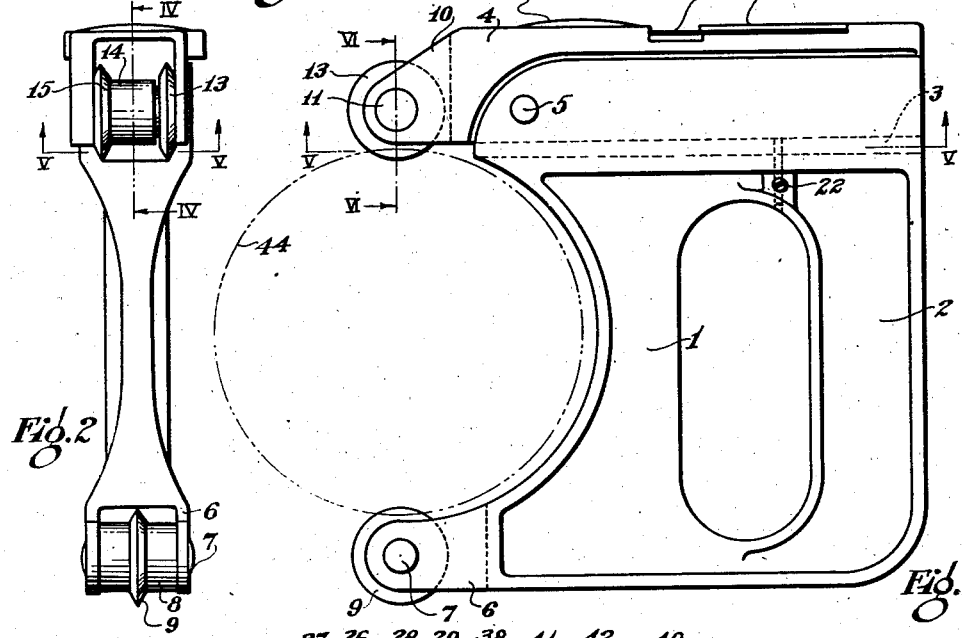
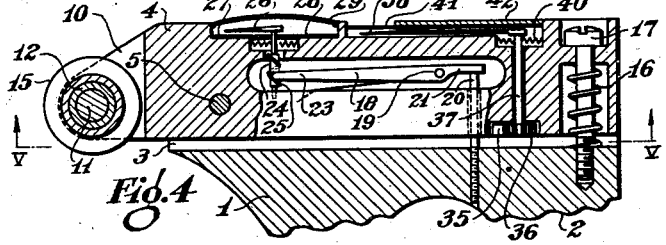
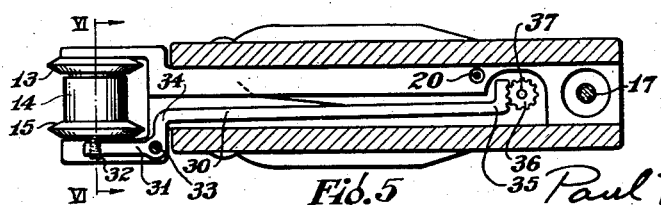
INVENTOR
Paul F. Zerkle
BY
Hawgood and Van Horn
ATTORNEYS Jan. 7, 1936.                P. F. ZERKLE                2,027,217
                              INDICATOR
                         Filed Jan. 28, 1932        2 Sheets—Sheet 2
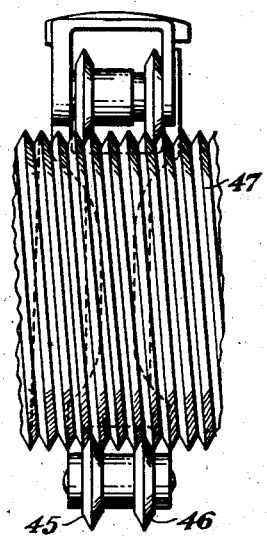
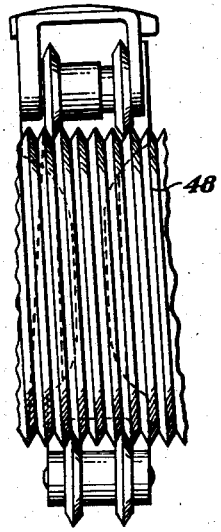
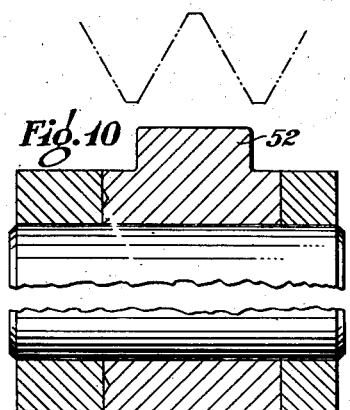
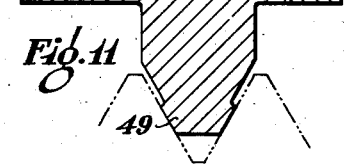
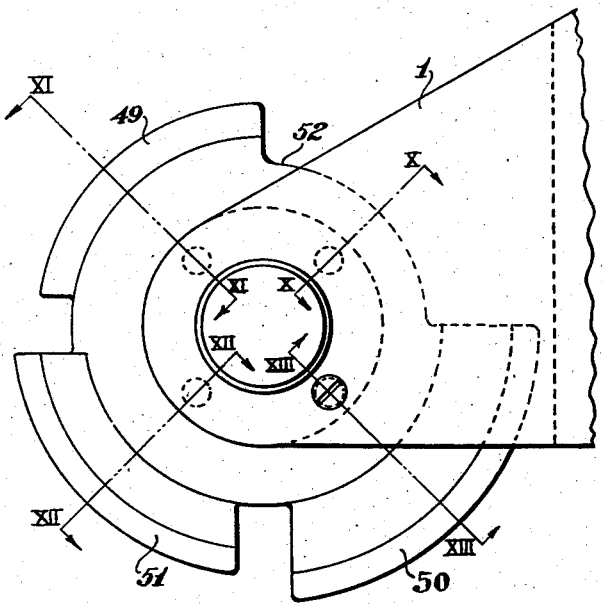
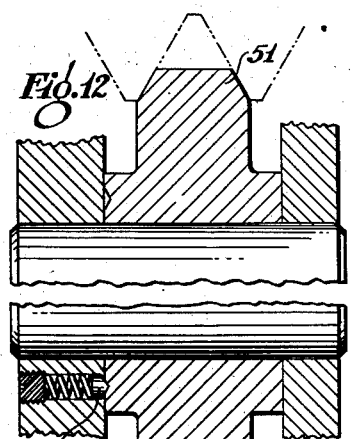
INVENTOR.
Paul F. Zerkle
BY
Hawgood and Van Horn
ATTORNEYS Patented Jan. 7, 1936

2,027,217

UNITED STATES PATENT OFFICE 2,027,217

INDICATOR

Paul F. Zerkle, Cleveland, Ohio

Application January 28, 1932, Serial No. 589,491

10 Claims. (Cl. 33—199)

This invention relates to measuring devices, and more particularly to devices for measuring objects provided with grooves or lands, such as threads, worms and the like.

An object of the invention is to provide an improved measuring instrument which will indicate both the diameter and lead of helical and like grooves or projections.

Another object is to provide an improved measuring instrument which will indicate variations from a desired form in the surfaces of helical and like grooves or projections.

Another object is to provide an improved instrument which will indicate variations in the obliquity of helical and like grooves or projections.

Another object is to provide an improved measuring instrument which will be simple in construction and operation.

Another object is to provide an improved measuring instrument which will be strong and easily maintained in adjustment.

Another object is to provide an improved measuring instrument which will be economical to manufacture.

Other objects will hereinafter appear.

The invention will be better understood from the description of two practical embodiments thereof, showing devices adapted for the measuring of screw threads, illustrated in the accompanying drawings, in which:

Figure 1 is a side elevation of an instrument having three contacts for engaging a thread.

Figure 2 is an end elevation of the device of Figure 1.

Figure 3 is a plan view of the device of Figure 1.

Figures 4, 5, and 6 are sectional views taken on the lines IV—IV, V—V, and VI—VI respectively of the first three figures, parts being broken away.

Figure 7 is a view corresponding to Figure 2 but showing a device having four thread engaging contacts applied to a piece having a correct thread.

Figure 8 is a view similar to Figure 7 showing how a thread of varying helix angle affects the device.

Figure 9 is an enlarged fragmentary elevation of one form of contact; and

Figures 10 to 13 are fragmentary sectional views taken on the lines X—X to XIII—XIII respectively of Figure 9.

The device shown in Figures 1 to 6 consists of a frame 1 shown as approximately C shaped, provided with a spade handle 2, and conveniently composed of a casting or forging. In the upper edge of the frame is a slot or recess 3 in which is pivoted intermediate its ends a lever or beam 4 by means of a pin 5. The lower end of the frame is bifurcated at 6, the furcations being spanned by a pin or axle 7 upon which is mounted a contact, shown as a roller having a hub 8, and a frustro-conical wheel like contacting portion 9.

The end of the beam which projects above this roller is also bifurcated at 10 and spanned by a pin or shaft 11. Upon this shaft is journalled a sleeve 12 provided with a frustro-conical roller or wheel like contacting portion 13, the sleeve being of sufficient length to prevent any axial movement of the roller, as clearly shown in Figure 6. Upon the sleeve is journalled a second sleeve 14 provided with a frustro-conical roller or wheel like contacting portion 15, the second sleeve being free to move axially upon the first, for a purpose to be hereinafter described.

While the contacts are shown as rollers, free to rotate on their respective shafts, it will be obvious that contacting shoes or any other form of contact might be used. Rollers are particularly well adapted where measurements at one part only of a thread are desired (as at the pitch line) because of the distribution of wear about their peripheries and consequent long life of the contacts.

A spring 16 is interposed between the frame and beam to move the roller members carried by each toward the other, and an adjusting screw 17 passes through an aperture in the beam, and is threaded into the frame to limit the approach of these rollers.

The frame carries indicator mechanism which shows at any instant the proximity of the two roller shafts, this being given to any desired degree of minuteness, most conveniently in thousandths or tenths of thousandths of an inch.

The indicator consists of a lever 18 pivoted intermediate its ends within the beam upon a pin 19, and an adjusting screw 20 is threaded into the frame and arranged to bear upon the shorter end 21 of the lever, this adjusting screw being locked in adjusted position by a set screw 22 also threaded into the frame.

The long end 23 of the lever has a contact engaging a helical land 24 upon a vertical staff 25 journalled in the beam, which staff is provided at its upper end with a hand or pointer 26, moving over the graduated dial 27. A torsion spring 28 is connected between the staff and the beam, which urges the hand in a counterclockwise direction, as viewed in Figure 3, causing the end 23 of the lever to bear always upon the upper surface of the land 24. A transparent cover or crystal 29 is positioned over the hand and dial to exclude dirt and the like.

A second indicator mechanism is provided to indicate the axial movement of the slidable sleeve 14 upon the non-slidable sleeve 12. This consists of a lever 30 having a short end 31 provided with a set screw 32 or other adjustable contact engaging sleeve 14 or contact 15, the lever being pivoted within the beam upon a pin 33 and having its longer inner end offset as indicated at 34, to bring it within the interior of the beam. At the extremity 35 of the long end of the lever is formed a toothed sector engaging a pinion 36 carried by a vertical staff 37 journalled with the beam. The upper end of the staff is provided with a hand or pointer 38 moving over the graduated arc or dial 39 contained within a recess in the beam adjacent the first mentioned dial. A torsion spring 40 is interposed between the staff and beam so that one side of the sector teeth will engage with the cooperating side of the pinion teeth at all times.

A second transparent cover or crystal 41 overlies this pointer and dial and is conveniently secured in place by a covering plate 42 attached to the beam by screws 43, as shown in Figure 3.

The operation of the device is as follows:—

When the operator wishes to engage a thread, he grasps the frame by means of the handle and slides the contacting rollers onto the threaded portion 44 of the piece to be measured. Each roller, of course, engages the space between two successive convolutions of the thread, the two upper rollers engaging threads several convolutions apart and the lower roller being between the upper rollers and engaging a thread preferably half a convolution away from that engaged by the upper stationary roller.

Obviously the diameter of the piece will control the distance between rollers 9 and 13 and variations in the diameter will cause the beam to swing about its pivot, being indicated by the motion of hand 26. The distance between the two upper rollers will at the same time be indicated by the hand 38, and any variation from the desired pitch will be shown by motion of this hand. Of course, the most convenient way of using the instrument is to adjust both indicators to point to zero when the correct diameter and pitch are present, as by adjusting them about a master thread, and any deviation will be readily apparent, the amount of the deviation being indicated so that the operator can clearly see whether it is within allowable tolerances. The apparatus when so used may be considered as an indicating comparator, at all times comparing a thread to the master.

If the threads do not conform to true helices but are disposed, for instance, at a greater obliquity during a part of a convolution than at another, there will be a tendency on the part of the rollers on one side of the piece to be moved axially relative that on the other side. This will cause the measuring apparatus to cant or rock from side to side, this rocking being reflected by an oscillating of the indicator hands, and also by the diameter indicator, registering a diameter considerably in excess of that to which the piece was presumably cut.

The deviations of the thread from a true helix can more conveniently be ascertained by the instrument shown in Figures 7 and 8, in which two contacting members 45 and 46 are provided on the lower part of the apparatus, one of these being restrained against axial movement while the other may slide axially if desired.

As shown in the first of the two above mentioned figures, if the helix of the thread is correct, as the master thread 47, all four rollers will be in contact therewith, each contacting sides of two adjacent convolutions. If the thread, for instance, is steeper on one side than on the other, as illustrated by 48 in Figure 8, the device will rock in a counterclockwise direction, so that the left hand upper and right hand lower rollers are seated between adjacent convolutions, while the upper right hand roller will bear upon the side of one convolution only and the lower left hand roller will be entirely clear of the thread.

Obviously, the separating of the two shafts thus caused will be quite apparent on the diameter indicator (hand 26) while the two upper rollers will be free to move toward each other, showing a fluctuation upon the lead indicator (hand 38).

It will probably be most convenient to make one of the lower contacts cut away throughout a portion of its circumference so that it may be adjusted to bring the full diameter portion into contact with the thread or to bring the cut away portion into proximity to the thread, in which position the apparatus will operate exactly as did the three roller device of the first six figures.

The additional contact may conveniently be formed as indicated in Figures 9 to 13 having a plurality of different contacting segments shown as, one 49, adapted to engage the threads at their pitch line, a second 50, being cut away so that it engages the threads only adjacent their root, and a third 51, engaging the threads only adjacent their crest; while the fourth section 52 is formed to clear the thread entirely.

All four contacts may be made as segmental shoes like that shown in Figures 9 to 13, and it is then possible to accurately gauge the shape of the thread by taking three readings, one with all of them adjusted to engage this thread at its pitch diameter; another with all adjusted to engage at the root; and another with all adjusted to engage at the crest. Any concavity or convexity of the thread surface, or any shallowness in the depth of the thread, is shown by the measurements at the depth measured.

A spring pressed detent 53 may be provided to engage a series of notches on the contacting shoes to hold them in adjusted position or a locking bolt, or other means for securing might be used. If rollers are used, best results will be obtained by forming them like section 49 so that they contact the thread at and near its pitch line.

While the invention is shown as applied to a thread, it may, of course, be applied to other helical objects, such as worms, and to other curves than the helix, as conical or spherical spirals.

It will be obvious that the lever with its two indicators may be transferred from one frame to another for use on articles of differing diameters, or that means for adjusting one or the other of the roller supporting shafts toward the other might be provided for this purpose.

While I have described the illustrated embodiments in some particularity, obviously many other embodiments will readily occur to those skilled in the art to which this appertains, and I therefore do not limit myself to the precise details shown and described herein, but claim as my invention all embodiments, variations and modifications coming within the scope of the appended claims.

I claim:

1. Measuring apparatus comprising a frame, a contacting element carried thereby, a lever pivoted to said frame, a shaft carried by said lever, a contacting element carried by said shaft and locked against axial movement thereon, another contacting element carried by the shaft, and free to move axially thereon, an indicator indicating the motion of the lever on the frame, and a second indicator indicating the motion of the last mentioned element on its shaft.

2. Measuring apparatus comprising a frame, a lever pivoted thereon, a contact fixed to said frame, a contact fixed to said lever, a contact carried by the lever and movable thereon, an indicator carried by the lever, connections between the indicator and the frame whereby relative movement of the lever and frame are indicated, and a second indicator carried by the lever actuated by the last mentioned contact.

3. Measuring apparatus comprising three contacting elements adapted to engage the walls of an external thread or the like, two on one side of the thread and one on the opposite side, resilient means moving the two first mentioned elements relatively toward each other, resilient means moving the first two elements relatively toward the third mentioned element, measuring means for measuring the distance between the first two mentioned elements, and measuring means for measuring the distance between the third mentioned element and the two first mentioned elements.

4. Measuring apparatus for measuring a helical thread or the like comprising a frame, a lever pivoted thereto, contact elements, one carried by the frame and the other by the lever, indicating mechanism actuated by the motion of the frame and lever relative to each other, one of said contacting elements comprising a pair of contacts in alignment axially of the thread and relatively movable, and indicating mechanism actuated by the relative motion of said contacts.

5. Measuring apparatus for measuring helical threads and the like comprising two pairs of contacting elements, the elements of each pair being movable relative to each other, and the pairs being movable relative to each other, measuring mechanism for indicating the distance between the pairs of elements, and measuring mechanism for indicating the distance between the elements of one pair.

6. Measuring apparatus, comprising a frame, a contacting element carried thereby, a support movably carried by the frame, a contacting element carried by said support, one of said contacting elements comprising two relatively movable contacts, means urging said contacting elements toward each other, measuring means indicating the distance between said contacting elements, means urging said contacts toward each other, and measuring means indicating the distance between said contacts.

7. Measuring apparatus comprising a frame, a lever pivoted thereon, a contact fixed to said frame, a contact fixed to said lever, a contact carried by the lever and movable thereon, an indicator carried by the lever, connections between the indicator and the frame where relative movement of the lever and frame are indicated, a second indicator carried by the lever actuated by the last mentioned contact, said contacts each comprising an element adapted to be adjusted about an axis and having a plurality of contacting surfaces of trapezoidal cross-section, the pairs of inclined sides of all the sections being disposed at the same angle to each other and the intersection of said pairs of inclined sides if projected being at the same distance from the axis, the bases of the trapezoid of each section being disposed at different distances from said axis than those of each of the other sections.

8. Measuring apparatus comprising a frame, a movable support carried thereby, parallel shafts one journalled on the frame and the other in the support, a plurality of contacting elements upon each of said shafts, the elements on one shaft being axially movable relative to each other, an indicating mechanism showing the relative position of said contacts on said shaft, and a second indicating mechanism showing the relative position of the support and frame.

9. Measuring apparatus for measuring helical threads or the like, including a plurality of contacting elements each supported for adjustment about its axis, each element having a plurality of contacting surfaces and being of trapezoidal cross-section, the pairs of inclined sides of all the sections being disposed at the same angle to each other and the intersection of said pairs of inclined sides if projected being at the same distance from the axis, the bases of the trapezoid of each section being disposed at different distances from said axis than those of each of the other sections.

10. Measuring apparatus for measuring helical threads or the like, including a plurality of contacting elements each consisting of a pivoted member having bearing portions concentric with the axis of its pivot and each supported for adjustment about its axis, said bearing portions lying in two oppositely disposed convex conical surfaces and defined by different zones in said conical surfaces.

P. F. ZERKLE.